United States Patent [19]

Cheong et al.

[11] Patent Number: 6,070,235
[45] Date of Patent: May 30, 2000

[54] DATA PROCESSING SYSTEM AND METHOD FOR CAPTURING HISTORY BUFFER DATA

[75] Inventors: Hoichi Cheong; Hung Qui Le, both of Austin, Tex.

[73] Assignee: International Business Machines Corporation, Armonk, N.Y.

[21] Appl. No.: 08/892,589

[22] Filed: Jul. 14, 1997

[51] Int. Cl.[7] .................................................. G06F 15/00
[52] U.S. Cl. ............................................ 712/23; 712/218
[58] Field of Search .............................. 395/800, 182.13, 395/185.02, 391, 182.04, 185.01, 587, 800.28, 733, 393, 394; 712/23, 24, 240, 217, 218, 205

[56] References Cited

U.S. PATENT DOCUMENTS

| | | | |
|---|---|---|---|
| 5,075,840 | 12/1991 | Grohoski et al. | 395/800 |
| 5,185,872 | 2/1993 | Arnold et al. | 395/393 |
| 5,261,071 | 11/1993 | Lyon | 395/425 |
| 5,345,569 | 9/1994 | Tran | 395/375 |
| 5,355,457 | 10/1994 | Shebanow et al. | 395/375 |
| 5,363,495 | 11/1994 | Fry et al. | 395/375 |
| 5,398,330 | 3/1995 | Johnson | 395/182.13 |
| 5,450,560 | 9/1995 | Bridges et al. | 711/200 |
| 5,500,943 | 3/1996 | Ho et al. | 395/375 |
| 5,581,775 | 12/1996 | Katz et al. | 712/210 |
| 5,651,124 | 7/1997 | Shen et al. | 395/391 |
| 5,805,906 | 9/1998 | Cheong et al. | 710/260 |
| 5,872,949 | 2/1999 | Kikuta et al. | 712/216 |
| 5,887,161 | 3/1999 | Cheong et al. | 712/244 |

OTHER PUBLICATIONS

Diefendorff, et al., "Organization of the Motorola 88110 Superscalar RISC Microprocessor," IEEE Micro, Apr., 1992, pp. 40–63.

PowerPC™ 604 RISC Microprocessor User's Manual, Motorola, Inc., 1994, pp. 87–102.

Primary Examiner—Larry D. Donaghue
Attorney, Agent, or Firm—Kelly K. Kordzik; Winstead Sechrest & Minick P.C.; Anthony V. S. England

[57] ABSTRACT

A data processing system includes logic to ensure result data stored in a history buffer is in a correct chronological order and is not overwritten until an appropriate point in time. The logic also ensures that the history buffer is able to capture result data that is produced with unexpected delays. The history buffer entries act as a "backup" for an architected register by storing older result data and rely on unique target identifiers assigned to dispatched instructions to keep the result data in a correct chronological order. Furthermore, a target identifier field of the architected register holds the latest target identifier assigned to a youngest instruction that modifies the architected register. Additionally, previous result data in the register is backed up in an allocated history buffer entry. If the result data is not yet available, the target identifier in the register will be deposited in the target identifier field of the history buffer entry. One timing cycle before a result data value is expected to be available, a target identifier assigned to the instruction producing the data is broadcast on the Result bus. If the result data is delayed at a next timing cycle, a re-execute signal is asserted on the Result bus to notify a history buffer entry or a register that the data is not ready to be stored therein. Furthermore, the re-execute signal remains asserted until the result data is available. During the same cycle, the re-execute signal is negated, result data is presented on the Result bus. A functional unit that broadcasts an asserted re-execute signal after it broadcasts a first target identifier, can broadcast a second target identifer before the re-execute signal is negated.

23 Claims, 8 Drawing Sheets

| State | TID_V_DD | TID_V_D | TID_V | Reexec | Next state | sel_rb assertion | hold_d | hold_dd | Capture result_data and result_v |
|---|---|---|---|---|---|---|---|---|---|
| S0 | 0 | 0 | 0 | x | S0 | | | | |
|    | 0 | 0 | 1 | x | S1 | | | | |
| State | TID_V_DD | TID_V_D | TID_V | Reexec | Next state | sel_rb assertion | hold_d | hold_dd | Capture result_data and result_v |
| S1 | 0 | 1 | 0 | 0 | S0 | | | | |
|    | 0 | 1 | 0 | 1 | S2 | calculate ingate if matching TID_D | | 1 | Capture if TID_D matched |
|    | 0 | 1 | 1 | 0 | S1 | | | | |
|    | 0 | 1 | 1 | 1 | S3 | calculate ingate if matching TID_D | | 1 | Capture if TID_D matched |

FIG. 4B

| Current State | | | | Next State | | | Action |
|---|---|---|---|---|---|---|---|
| S2 | 1 | 0 | 0 | 0 | S0 | | | calculate ingate if matching TID_DD | | Capture if TID_DD matched |
| S2 | 1 | 0 | 0 | 1 | S2 | | 1 | | | |
| S2 | 1 | 1 | 0 | 0 | S1 | | | calculate ingate if matching TID_DD | | Capture if TID_DD matched |
| S2 | 1 | 1 | 0 | 1 | S3 | | 1 | | | |
| S3 | 1 | 0 | 1 | 0 | S2 | | | calculate ingate if matching TID_DD | | Capture if TID_DD matched |
| S3 | 1 | 1 | x | 1 | S3 | 1 | 1 | | | |
| S3 | 1 | 1 | 1 | 0 | | | | Illegal input | | |

DATA PROCESSING SYSTEM AND METHOD FOR CAPTURING HISTORY BUFFER DATA

TECHNICAL FIELD

The present invention relates in general to data processing systems, and in particular, to monitoring and capturing mechanisms for pipelined data processing systems.

BACKGROUND INFORMATION

High performance processors currently used in data processing systems today may be capable of "superscalar" operation and may have "pipelined" elements. A superscalar processor has multiple elements which operate in parallel to process multiple instructions in a single processing cycle. Pipelining involves processing instructions in stages, so that the pipelined stages may process a number of instructions concurrently. In a typical first stage, referred to as an "instruction fetch" stage, an instruction is fetched from memory. Then, in a "dispatch" stage, the instruction is decoded into different control bits, which designate a type of functional unit for performing the operations specified by the instruction, source operands for the operation, and destination registers for results of operations. The decoded instruction is dispatched to an issue queue where instructions wait for data and an available execution unit. Next, in the "issue" stage, an instruction in the issue queue is issued to a unit having an "execution stage." The execution stage processes the operation as specified by the instruction. Executing an operation specified by an instruction includes accepting one or more operands and producing one or more results.

A "completion" stage addresses program order issues which arise from concurrent instruction execution, wherein multiple, concurrently executed instructions may deposit results in a single register. The completion stage also handles issues arising from instructions dispatched after interrupted instruction deposits results in a same destination registers. In the completion stage, an instruction waits for the point at which there is no longer a possibility of an interrupt before storing a data value, so that a depositing of a result will not violate a program order. At this point, the instruction is considered "complete." It should be noted that buffers to store execution results before results are deposited into the destination register and buffers to back up contents at specified checkpoints are provided in the instance an interrupt reverts the register content to its pre-checkpoint value. Either types of buffers may be utilized in a particular implementation. At completion, the results of the execution buffer and the holding buffer will be deposited into the destination register and the back-up buffer will be released.

Many state-of-the art superscalar central processor units that implement an in-order dispatch, out-of-order execution and in-order completion microarchitecture employ register renaming schemes to allow instructions that have output dependence or "anti-dependence" to execute in an order different from a dispatch order. Thus, an instruction that is younger in dispatch order may execute earlier than an older instruction. Additionally, in some circumstances more useful instructions are allowed to be processed per timing cycle.

State-of-the-art register renaming schemes typically implement a double pointer look-up in a register operand read access path. In this implementation, the register is first accessed to obtain a pointer in a future file. The future file location must also be subsequently accessed to retrieve the value. The register operand read-access operation is in a critical timing path that limits the operational speed of the processor. The double pointer look-up lengthens the time required to perform a register operand access, and hence prevents the processor from achieving a highest possible operation frequency. This disadvantage is magnified in processors with a small number of pipeline stages.

An alternative approach to the register renaming scheme described above is a history buffer scheme. In the history buffer scheme, the latest modification to an architected register is always kept in the architected register, as opposed to a future file required by the renaming scheme. Therefore, the double-pointer look up issue associated with the register renaming scheme is eliminated and the history buffer scheme is well suited for processors with a small number of pipeline stages.

Therefore, a need exists for a data processing system and method which insures that instructions are executed correctly and efficiently. A need also exists for a method for storing result data in a history buffer that are produced by older dispatched instructions targeting a particular register as opposed to the latest dispatched instruction in the presence of the possibility that the result data can be produced with an unpredictable length of delay.

SUMMARY OF THE INVENTION

The previously mentioned needs are fulfilled with the present invention. Accordingly, there is provided, in a first form, a data processing system. The data processing system includes a logic unit for issuing a first instruction having a first target identifier. A first functional unit is connected to the logic unit for receiving the first instruction. The first functional unit provides a first result identifier, a first result, and selectively negates a first control signal. A storage circuit is connected to the logic unit for receiving the first target identifier and is connected to the first functional unit for monitoring the first result identifier. Additionally, the storage circuit is connected to the first functional unit for receiving the first control signal. The storage circuit stores the first result when the first result identifier is provided and when the first control signal is in a first logic state.

Additionally, there is provided, in a second form, a method for capturing data in a data processing system. The method includes the steps of issuing a first instruction having a first target identifier from a logic unit, receiving the first instruction and the first target identifier at a first functional unit, and enabling the first functional unit to provide a first result identifier, a first result, and to selectively negate a first control signal. The method also includes the steps of receiving the first result identifier at a history buffer, enabling the history buffer to monitor an output of the first functional unit for the first result identifier, receiving the first control signal at the history buffer, and enabling the history buffer to store the first result when the first result identifier is provided and when the first control signal is in a first logic state.

Furthermore, there is provided, in a third form, a program storage device readable by a machine, tangibly embodying a program of instructions executable by the machine to perform method steps for capturing data in a data processing system. The method steps include issuing a first instruction having a first target identifier from a logic unit, receiving the first instruction and the first target identifier at a first functional unit, and enabling the first functional unit to provide a first result identifier, the first result, and to selectively negate a first control signal. The method steps also include the steps of storing the first target identifier at a history buffer, enabling the history buffer to monitor an output of the first functional unit for the first result identifier, receiving the first control signal at the history buffer, and enabling the history buffer to store the first result when the first result identifier is provided and when the first control signal is in a first logic state.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention implements a data processing system which utilizes a history buffer in an efficient manner to ensure that data is stored therein in a correct chronological order and the data is not overwritten until an appropriate point in time. In the present invention, older register values replaced by the results of speculatively executed instructions are saved in the history buffer in chronological order. When speculative execution is found to be incorrect, the saved values are used for recovering the processor to a state prior to the start of speculation. The saved values can then be discarded once a recovery operation is executed or once recovery from a speculative execution is found to be unnecessary. The history buffer of the present invention uniquely performs this function by recognizing a register value may not yet be produced by a previous instruction which modified the register value when the register value was being stored in the history buffer. In this case, the present invention provides a method for ensuring the data will be captured in the history buffer in a correct chronological order.

The data processing system of the present invention performs these functions by utilizing a unique target identifier, referred to as a TID, which is assigned to an instruction. A TID value associated with an instruction is provided to each execution unit and functional block that the instruction is routed to until the instruction is completed and the TID is retired. It should be noted that in the present invention, instructions which modify zero or one register are assigned one TID, and instructions which modify two registers are assigned two TIDs. Each register in the data processing system of the present invention has a data field, a TID field, and a W bit. A latest instruction which modifies a register deposits a TID assigned to the instruction in the TID field of the register. Furthermore, the W bit of the register is negated to indicate that data is pending and cannot currently be written in the register. Furthermore, one timing cycle before a result data value is expected to be complete, the functional unit that executes the instruction broadcasts the TID assigned to the instruction for modifying a particular register. If the result data is delayed at a next timing cycle, a re-execute signal will be asserted on the result bus to notify an architected register that the data is not ready to be stored therein. Furthermore, the re-execute signal remains asserted until the data value is able to be stored in the register. During the same timing cycle the re-execute signal is negated, a data valid signal is asserted and result data is presented on the result bus. While a functional unit is asserting a re-execute signal, the functional unit can broadcast one additional result TID for the pending result data of a subsequent instruction. After that point, additional result TIDs from the same functional unit cannot be broadcast. With two outstanding result TIDs, the functional unit can broadcast a subsequent TID one cycle after it negates a re-execute signal.

The foregoing description provided a brief overview of operation of the present invention. However, the following description will provide more detailed information regarding the connectivity of the elements of the present invention, as well as a more detailed description of operation of the present invention.

Description of Connectivity

Figure 1:
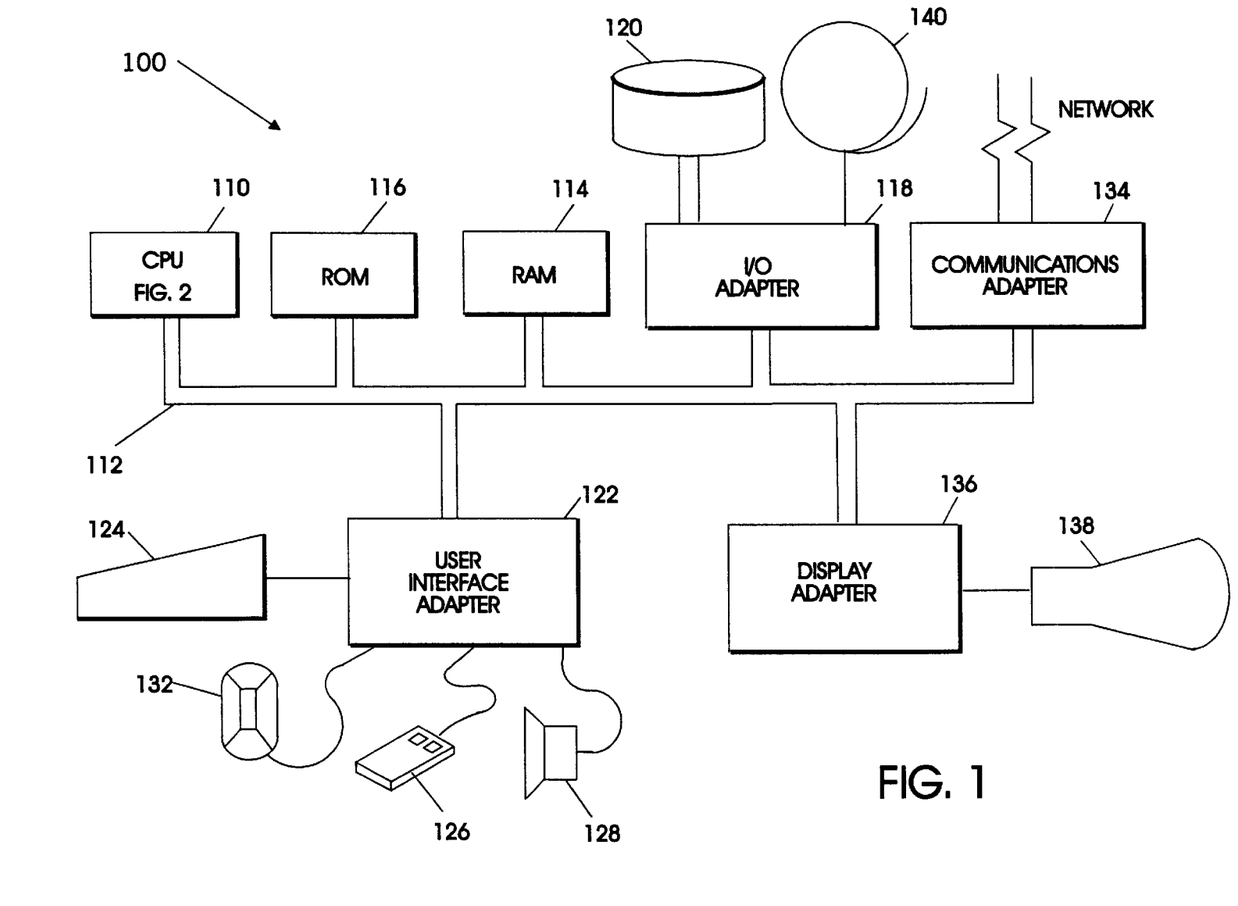
FIG. 1 illustrates, in block diagram form, a data processing system in accordance with one embodiment of the present invention.

One embodiment of the present invention is illustrated in FIG. 1. Referring first to FIG. 1, an example is shown of a data processing system 100 which may be used for the invention. The system has a central processing unit (CPU) 110. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120 and tape storage device 140. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
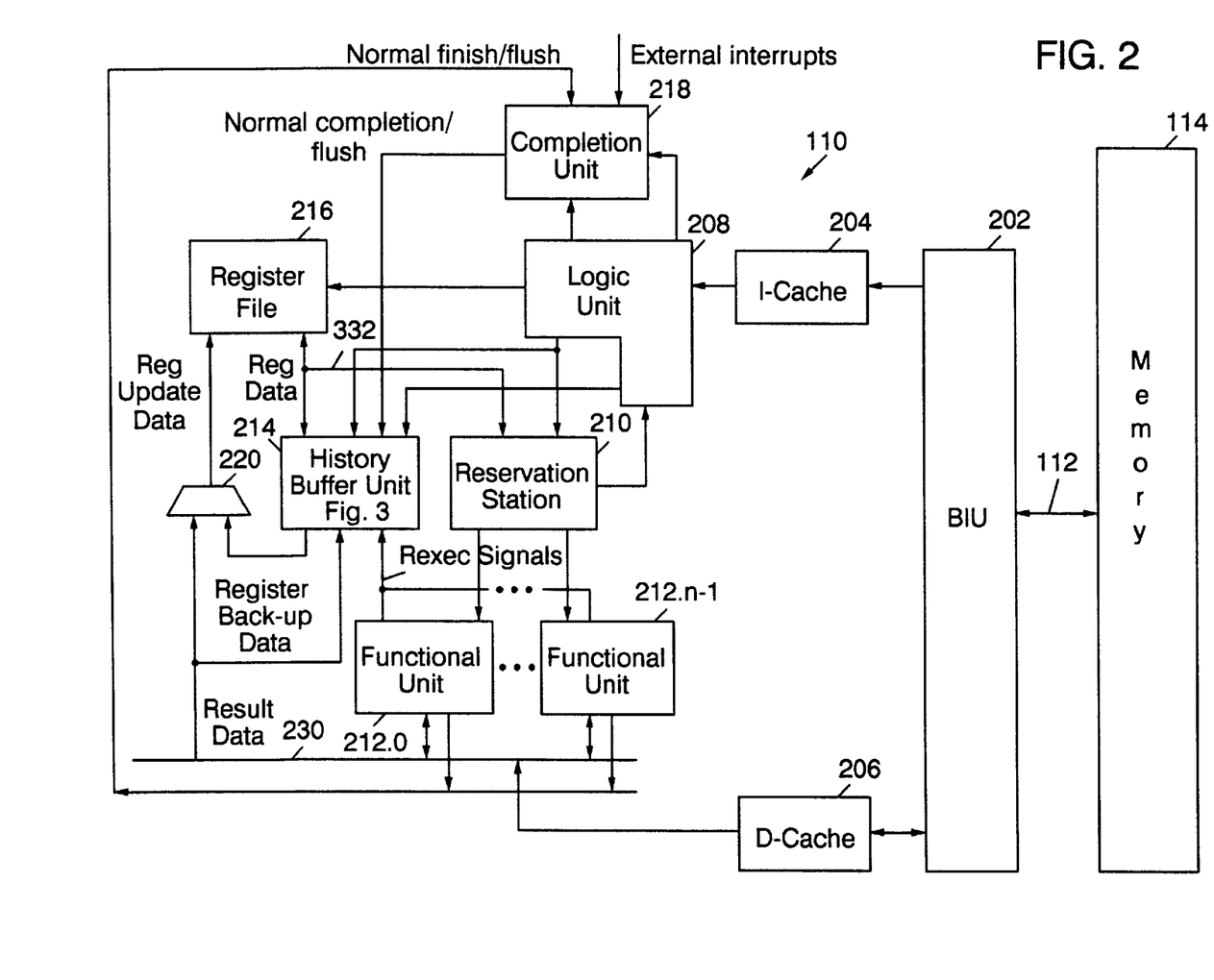
FIG. 2 illustrates, in block diagram form, a pipeline processor in accordance with one embodiment of the present invention.

FIG. 2 illustrates a portion of CPU 110 in greater detail. CPU 110 comprises a bus interface unit (BIU) 202, an instruction cache (I-cache) 204, a data cache (D-cache) 206, a logic unit 208, a reservation station 210, a plurality of functional units 212.0 through 212.n-1, a history buffer unit 214, a register file 216, a multiplexer 220, a completion unit 218, and a memory 114. Memory 114 is bidirectionally coupled to BIU 202 via a system bus 112. BIU 202 is coupled to I-cache 204 and bidirectionally coupled to D-cache 206. I-cache 204 is coupled to logic unit 208. Logic unit 208 is coupled to completion unit 218, register file 216, history buffer unit 214, and reservation station 210. Completion unit 218 receives a plurality of External Interrupts and a Normal Finish signal and a Flush signal. Completion unit 218 is coupled to history buffer unit 214 to provide a Normal Completion/Flush signal. Reservation station 210 is coupled to logic unit 208 and to each of the plurality of functional units 212.0 through 212.n-1. History buffer unit 214 is coupled to a first input of multiplexer 220. D-cache 206 is coupled to the plurality of functional units 212.0 through 212.n-1 and a second input of multiplexer 220 via a Result bus 230. It should be noted that each of the functional units corresponds to an individual result bus which collectively form Result bus 230. The Result bus 230 is also coupled to history buffer unit 214. Multiplexer 220 is coupled to register file 216 to provide Reg (Register) Update Data busses. Register file 216 is coupled to each of history buffer unit 214 and reservation station 210 to provide Reg (Register) Data busses. Each of the plurality of functional units 212.0 through 212.n-1 is coupled to history buffer unit 214 via a plurality of Reexec (re-execute) signals. For example, functional unit 212.0 is coupled to history buffer unit 214 via a Reexec 0 signal and functional unit 210.n-1 is coupled to history buffer unit 214 via a Reexec n-1 signal. Similarly, reservation station 210 is coupled to each of the plurality of functional units 212.0 through 212.n-1.

Figure 3:
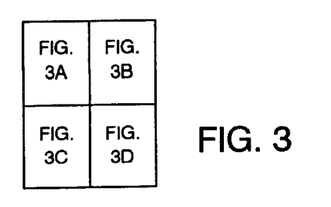
FIG. 3 is a combination of FIGS. 3A, 3B, 3C, and 3D.
Figure 3A:
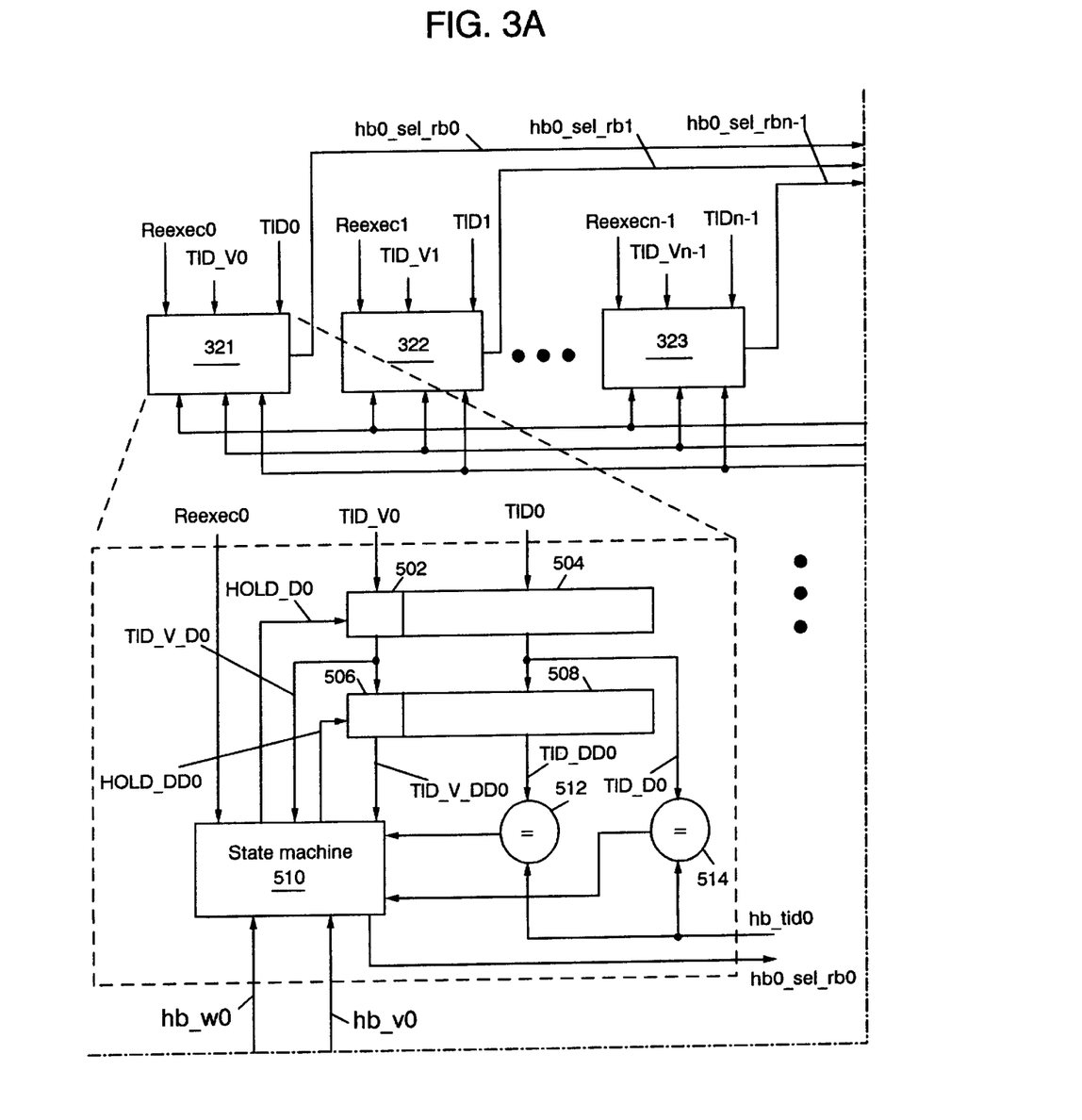
FIG. 3A illustrates, in block diagram form, a history buffer in accordance with the present invention.
Figure 3B:
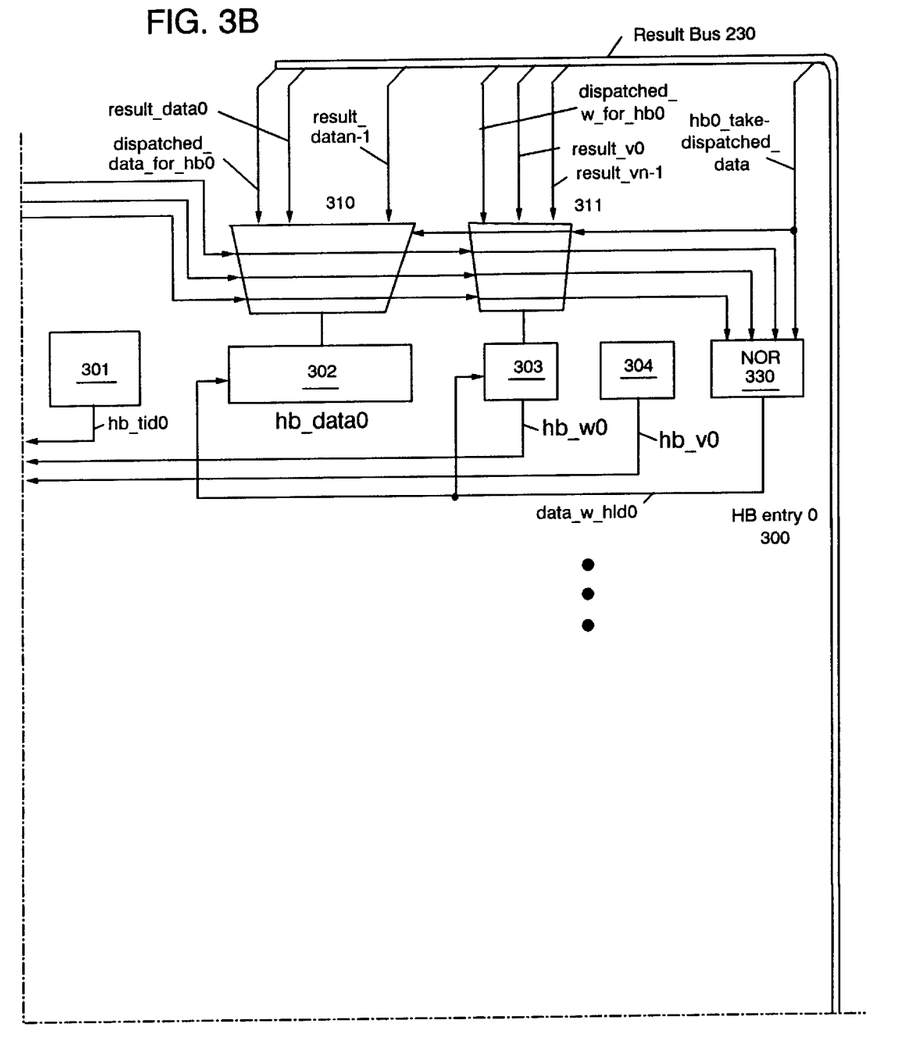
FIG. 3B illustrates, in block diagram form, a portion of the history buffer of the present invention.

FIGS. 3A through 3D illustrate a portion of history buffer 214 in greater detail. For conciseness, FIGS. 3A through 3B illustrate only HB (history buffer) entry 0 (300) and HB entry j (400) in detail. For each history buffer entry, (e.g. HB entry 0 (300)), an hb_tid (301), an hb_data (302), an hb_w (303), and an hb_v (304) register are illustrated.

For each of the history buffer entries, input sources to an hb_data register (302, 402) comprise "n" possible result bus data signals which are respectively labeled result_data0 through result_data n-1. Each of the result bus data signals is provided from a functional unit via Result bus 230. An existing target register data to be "backed up" in a particular history buffer entry of interest on instruction dispatch is also an input source. A path for communicating to the existing target data register is labeled "dispatched_data_for_hb0" in FIG. 3B and is labeled "dispatched_data_for_hbj" in FIG. 3D. This path is illustrated for completeness. The particular history buffer entry into which the register data to be stored on instruction dispatch is an unused history buffer entry.

For each of the history buffer entries, input sources to the hb_w register comprise the "n" possible result bus valid signals, result_v0 through result_vn-1. Each of the result bus valid signals sourced by a functional unit qualifies the validity of the corresponding data signal on result bus 230. The input sources to the hb_w register (303, 403) also include an existing target register "w" bit to be stored in a particular history buffer entry of interest upon instruction dispatch. A path for the existing target data register "w" bit is labeled "dispatched_w_for_hb0" in FIG. 3B and is labeled "dispatched_w_for_hbj" in FIG. 3D. This path is shown for completeness. It should be noted that the "w" data to be stored is preassigned to an unused history buffer entry of interest. The "w" bit has a logic one value when the data in the hb_data register stores a result of the instruction that produces the data. The "w" bit has a logic zero value when the result is pending.

Inputs to hb_data register 302 (402) are selected by multiplexers 310 (410). Inputs to hb_w bit register (303 (403)) are selected by 311 (411) with the same set of select controls signals. The select control signals comprise the hb0_take_dispatched_data selects for hb_data0 register 302, dispatched_data_for_hb0 as input to hb_data0 register 302 and dispatched_w_for_hb0 as an input to hb_w0 bit register 303.

The hb0_sel_rb0 signal generated by control block 321 selects result_data0 signal to be provided to hb_data0 register 302 and the result_v0 signal to be provided to hb_w0 bit register 303. Likewise, the hb0_sel_rb1 signal generated by control block 322 selects the result_data1 signal to be provided to hb_data0 register 302 and the result_v1 signal to be provided to hb_w0 bit register to 303. Assuming "n" result sources, control block 323 generates select signals for the result data and valid bit from result bus n-1.

Figure 3C:
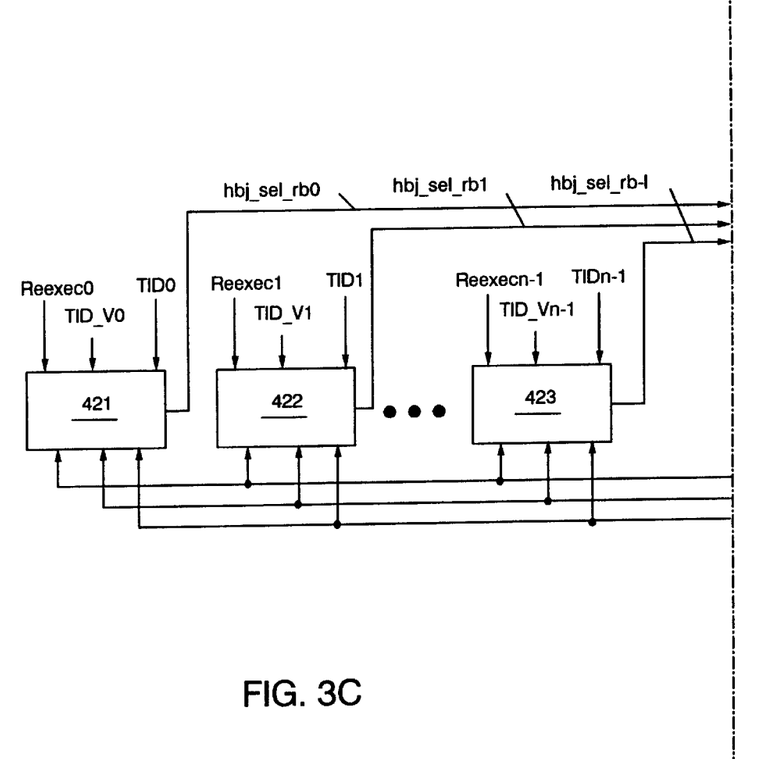
FIG. 3C illustrates, in block diagram form, a portion of the history buffer of the present invention.
Figure 3D:
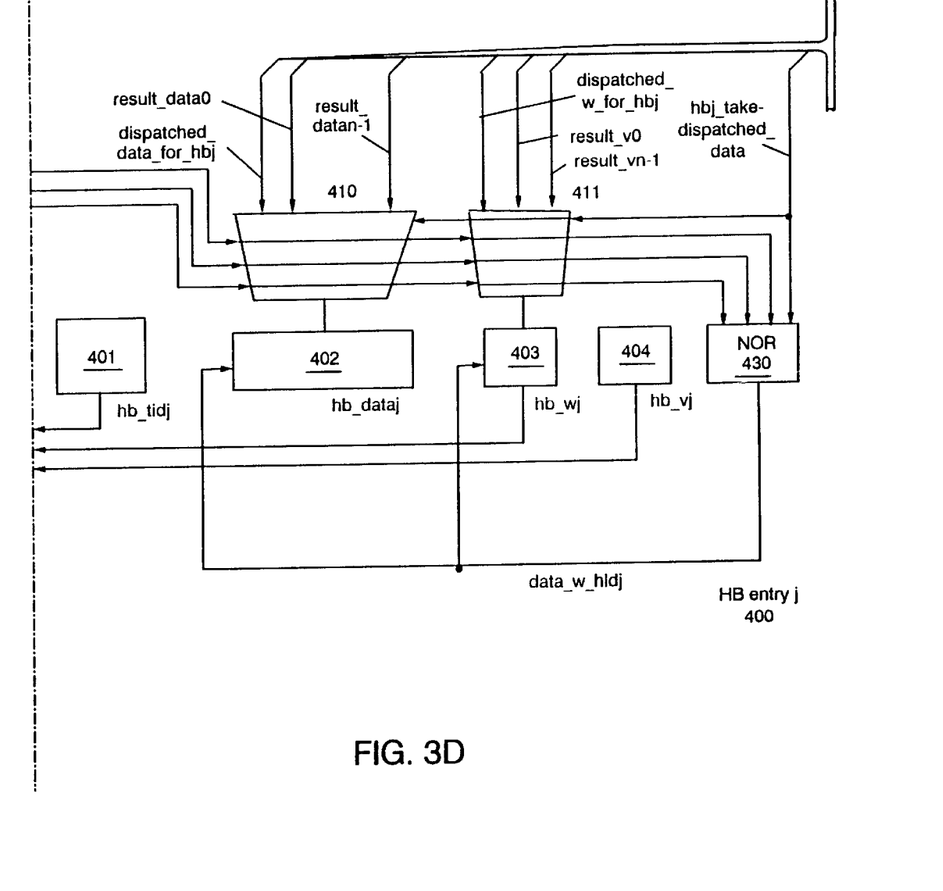
FIG. 3D illustrates, in block diagram form, a portion of the history buffer of the present invention.

For hb entry j 400, the hbj_take_dispatched_data signal selects dispatched data for _hbj as an input to hb_dataj register 402 and selects dispatched_w_for_hbj signal as an input to hb_wj bit register. The hbj_sel_rb0 through hbj_sel_rbn-1 signals are generated by control blocks 421, 422, and 423 respectively for each of a plurality of control select inputs of a multiplexer. The NOR gates 330 and 430 receive the multiplexer select signals respectively generate a data_ w_hld0 signal and a data_w_hldj_signal. If the data_w_ hld0 signal or the data_w_hldj signal is negated, the output of a respective one of NOR gate 330 and NOR gate 430 enables the registers 302 and 303 or 402 and 403 respectively, to latch in the input.

Control blocks 321 and 421 receive inputs, reexec signals TID V signals and TID values from Result bus 0. Block 322 and 323 and blocks 422 and 423 take inputs from result bus 1 and result bus n−1, respectively. Control blocks 321, 322, and 323 or control blocks 421, 422, and 423 receive the outputs of hb_tid0 301, hb_w0 303, and hb_v0 304 and hb_tidj 401, hb_wj 403, and hb_wj 404, respectively.

The control blocks have the same internal structure as illustrated in the box with dotted boundary in FIG. 3A. Each block has a buffer 502, a buffer 504, a buffer 506, a buffer 508, a comparator 512, a comparator 514 and a state machine 510.

As illustrated in control block 321, a representation circuit of each of the plurality of a control block, Reexec 0 signal is provided from the plurality of Reexec signals (of FIG. 2) to a first input of state machine 0 510. A TID_V0 signal is provided to buffer 502 and state machine 0 510. Similarly, a TID0 signal is provided to buffer 504. An output of buffer 502 is coupled to state machine 0 510 and buffer 506 to provide a TID_V_D0 signal. An output of buffer 504 is coupled to buffer 508 and comparator 514 to provide a TID_D0 signal. Buffer 508 is coupled to comparator 512 to provide a TID_DD0 signal. State machine 510 is coupled to buffer 502 and 504 to provide a Hold_D0 signal. State machine 0 510 is coupled to buffer 506 and 508 to provide a Hold_DD0 signal. An output of comparator 512 is coupled to state machine 0 510. An output of comparator 514 is coupled to an input of state machine 0 510. TID register 301 is coupled to comparator 514 and comparator 512. State machine 0 510 is coupled to multiplexer 310 and multiplexer 311 to provide a hb0_sel_rb0 signal.

It should be noted that FIG. 3 illustrates only a portion of the first entry and an arbitrary entry "j" of history buffer unit 214. Furthermore, each of the other entries has a similar configuration to those illustrated in FIGS. 3A through 3D. The presence of additional entries in the portion of history buffer 214 is represented by the columns of "dots" interspersed between a first entry of the history buffer and an entry j of the history buffer.

The foregoing discussion provides a description of connectivity of the elements utilized in implementing one embodiment of the present invention. A description of operation of each of these elements will subsequently be provided in greater detail. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Description of Operation

To clearly point out novel features of the present invention, the following discussion omits or only briefly describes conventional features of information processing systems which are apparent to those skilled in the relevant art. It is assumed that those skilled in the relevant art are familiar with superscalar processors. In particular, it is assumed that those skilled in the art are familiar with processors which operate in an in-order dispatch, out-of-order execution, and in-order completion fashion.

FIG. 1 illustrates an example of a data processing system 100 which may be used for the invention. The system has a central processing unit (CPU) 110, which is illustrated in greater detail in FIG. 2.

Before describing operation of CPU 110 in greater detail, it should be noted that CPU 110 comprises various registers, buffers, memories, and other units formed by integrated circuitry. Additionally, CPU 110 operates according to reduced instruction set computer (RISC) techniques. Furthermore, CPU 110 processes instructions according to processor cycles which are synchronized, in some aspects, to an internal clock (not illustrated in detail herein). Upon reference to FIG. 2, it should be noted that CPU 110 has a bus interface unit (BIU) 202 which is coupled to bus 112 for controlling transfers of data and instructions between memory elements, such as random access memory 114 and I-cache 204 or D-cache 206.

During operation, instructions are processed in CPU 110 in a sequence of logical, pipelined stages, as has been previously described. However, it should be well understood that the functions of these stages, as implemented in the preferred embodiment of the present invention, may be merged together. Therefore, this particular division of stages should not be taken as a limitation, unless such a limitation is indicated herein. Indeed, some of the previously described stages are indicated as single logic unit 208 in FIG. 2, for the sake of simplicity of understanding, and because each distinction between stages is not necessarily central to the present invention.

Logic unit 208 of FIG. 2 comprises fetch, branch processing, instruction buffer, decode, and dispatch units. Logic unit 208 fetches instructions from I-cache 204 into an instruction buffer. This fetching operation is based on a normal sequence of the instructions or a predicted sequence, when a sequence has a conditional branch instruction. It should be noted that the predicted sequence is provided in accordance with addresses selected by a branch processing unit within logic unit 208. Logic unit 208 also decodes the instructions and dispatches in their original program sequence. In dispatching an instruction, the dispatch unit assigns a target identifier (TID) to the instruction. The TID is a value which is unique to the instruction and is assigned sequentially with respect to previously assigned TIDs. Therefore, an instruction can be uniquely identified by its TID and a sequence by which instructions are dispatched can be inferred from a comparison of the TIDs of the instructions. It should be noted that the TID may remain associated with the assigned instruction until the instruction is completed and the TID is retired. Register file 216 comprises a TID field, a data field, and a W bit. The W bit indicates whether data remains to be written in response to execution of an instruction.

Logic unit 208 issues instructions to an appropriate one of the plurality of functional units 212.0 through 212.n−1 via reservation station 210. Furthermore, if an instruction targets a register, the W bit of the register is reset to indicate that a write-back of data is pending for the instruction. Furthermore, the TID assigned to the instruction is stored in the TID field of the register to identify the instruction for which the data is pending.

During a write-back stage of processing, one of the plurality of functional units 212.0 through 212.n−1 asserts a register pointer on a predetermined portion of Result bus 230. The register pointer identifies target register write-back data for the instruction, the TID for the instruction, and the resultant data value. If the TID on Result bus 230 matches a TID stored in the TID field of a target register, the result is written back to that target register. Also, the result may be monitored on Result bus 230 by history buffer unit 214. The monitoring action performed by history buffer unit 214 will subsequently be described in greater detail. A result stored in history buffer unit 214 may be restored to a register 216 via Reg Data Bus 332.

One of the plurality of functional units 212.0 through 212.n−1, which is executing the instruction, signals a completion unit 218 upon execution of instructions. Subsequently, completion buffer 218 retires the instruction. During this retiring process, completion unit 218 notifies history buffer unit 214 that the instruction has been retired. Completion unit 218 or logic unit 208 also notifies history buffer unit 214 about exception conditions and mispredicted branches for which instructions dispatched after an exception-causing instruction or after a mispredicted branch operation should be discarded and for which CPU 110 should be recovered to a prior known state backed up in the history buffer.

While history buffer unit 214 will subsequently be described in greater detail, a general description of history buffer unit 214 will be provided herein. It should be noted that history buffer unit 214 comprises a plurality of storage locations for holding history buffer entries. As an instruction is dispatched by logic unit 208, a history buffer entry is created for each register within register file 216 targeted by the instruction. According to the terminology used herein, when an instruction performs an operation affecting the contents of a register, the operation is said to "target" that register. In this case, the instruction may be referred to as a "targeting instruction" and the register is referred to as a "target register" or a "targeted register." Furthermore, it should be noted that an instruction for which a history buffer entry is created is referred to as the "entry instruction" for that particular entry. Furthermore, a "current entry instruction" indicates a dispatched instruction for which an entry instruction is of current interest in the context of the discussion or is the most recently created entry instruction.

FIGS. 3A through 3D illustrate a portion of history buffer unit 214 in greater detail. In the portion of history buffer unit 214, each history buffer unit includes a data field stored in data register 302, a validity bit stored in V register 304, a TID field stored in TID register 301, and a write bit stored in W register 303. It should be noted that the validity bit indicates whether a storage location of a corresponding history buffer entry stores a valid entry, while the W bit identifies the validity of either the data field or the TID field. Furthermore, it should be noted that the history buffer entry will also include other information needed to restore a processor to a preselected state. For example, this additional information may include a group identification field to uniquely identify a most recently dispatched interruptible instruction preceding or including the entry instruction, a target register to identify a register which is the target of an entry instruction and an L bit to identify an entry as a first entry created after an interruptible point. However, for the sake of clarity, these values will not be illustrated or discussed in further detail herein. For more information on history buffers, refer to a patent application having Ser. No. 08/729,309, filed Oct. 15, 1996, and entitled "Method and Apparatus for Condensed History Buffer" (Attorney Docket No. AT9-96-115), which is hereby incorporated by reference. Additionally, refer to a patent application having a Ser. No. 08/729,307, filed Oct. 15, 1996, entitled "Method and Apparatus for Improved Recovery of Processor State Using History Buffer" (Attorney Docket No. AA9-96-009), which is hereby incorporated by reference herein.

Operation of the portion of history buffer 214 of FIGS. 3A through 3D will subsequently be described in greater detail. As previously mentioned, an entry of history buffer 214 stores a copy of an existing value found in a particular architected register when an instruction being dispatched by logic unit 208 modifies the contents of the particular architected register. However, because the instructions are being executed by a pipelined data processor which executes multiple instructions in parallel, it is possible that the register value which is being stored in history buffer unit 214 has not yet been produced by a previous instruction which modified the particular architected register. In this case, a TID corresponding to the instruction will be stored within history buffer 214. History buffer 214 then monitors results provided by one of the plurality of functional units 212.0 through 212.n–1 via Result bus 230 to determine when the register value is provided. At that point, history buffer unit 214 captures the register value and stores it in an appropriate history buffer entry location. However, history buffer unit 214 must be carefully controlled so that a correct register value in a correct chronological order is captured. For example, as CPU 110 executes instructions out-of-order, history buffer unit 214 may not rely on a simple chronological methodology for capturing the register value provided by one of the plurality of functional units 212.0 through 212.n–1. Therefore, if the register value may not be accessed from a local memory, but must be accessed from an external memory in multiple clock cycles, the pipeline of CPU 110 will continue to execute instructions and return results of subsequent instructions before the register result is obtained from the external memory. In this case, history buffer unit 214 must correctly recognize when the register result value is being provided by Result bus 230.

History buffer unit 214 relies on the characteristic operation of CPU 110 in implementing a unique methodology for determining when a desired value is transmitted on Result bus 230. During this characteristic operation, an instruction which modifies a target register or registers is issued to an appropriate one of the plurality of functional units 212.0 through 212.n–1. One timing cycle before the result data is expected to be provided to the target register, the TID field or fields corresponding to the registers are broadcast on Result bus 230. During operation, each of the plurality of functional units 212.0 through 212.n–1 anticipates a cycle that data is ready. This anticipation operation is generally accurate, with the exception of data loading operations from memory. It should be noted that the latency associated with data loading operations from memory is determined by a memory location of the data.

Subsequently, at a next timing cycle, a Reexec signal is asserted on Result bus 230 to notify the targeted register that the data is not available to be stored therein. Subsequently, the Reexec signal remains asserted until the data is available to be stored within the targeted register. In a same timing cycle, the Reexec signal is negated and the resultant data is presented on Result bus 230. It should also be noted that one of the plurality of functional units 212.0 through 212.n–1 can also broadcast a TID for a next result data value, while an existing re-execution operation continues for the result data of a previous operation. When there is an outstanding result being re-executed from one of the plurality of functional units 212.0 through 212.n–1, an additional TID can be broadcast using this methodology and the performance of the pipelined architecture of the present invention will be maximized.

History buffer 214 is able to utilize the characteristics of CPU 110 and the Reexec signal to ensure that data is captured in a correct chronological order even when the data has not yet been generated at the time a backup copy is stored in history buffer unit 214.

To perform this operation, history buffer unit 214 monitors a plurality of sets of signals from Result bus 230. Each set of signals sourced by a functional unit, includes a reexec signal, a TID_V signal, a TID signal, an RD (Result Data) signal, and an RV (Result_V) signal. These sets of signals are used to determine when a value provided on the corresponding RD signal transferred via Result bus 230 is the value which should be stored within history buffer unit 214. Logic for performing these operations for each set of these signals is included within a state machine. Such state machines comprise state machine 0 510 in each of control blocks 310 through 323. Of the aforementioned signals, the Reexec signal is provided to indicate that expected data is not yet available after execution of an instruction. Furthermore, the Reexec signal will remain asserted until the data is available, as previously mentioned. The TID_V signal is provided to qualify the TID signal. Additionally, as previously mentioned, the TID value corresponds to a certain instruction and indicates a relative age of the instruction as compared to other pending instructions. The RD signal indicates a data value provided by a functional unit via Result bus 230. Furthermore, the RV values captured by history buffer unit 214 which indicate whether the results provided via the RD signal is valid. The RV signal qualifies the RD value. If the RV signal is not asserted, the RD value does not transfer data needed and any value which it transfers is invalid. In the present invention, history buffer unit 214 may capture invalid data, but the negated RV signal captured in the W register of a history buffer entry indicates that the history buffer entry still needs data. Valid data will be redelivered when it becomes available.

During operation, history buffer unit 214 executes steps to store "backup" copies of data values which have been overwritten in a corresponding target register and which may be included within the plurality of architected registers of register file 216. During operation, the state machine of each entry of history buffer unit 214 controls a plurality of latches for storing relevant TID values. In the portion of history buffer 214 illustrated in FIG. 3A, in each control block, a first latch is formed by buffer 502 and buffer 504, and a second latch is formed by buffer 506 and buffer 508. A TID value, corresponding to a data value which has been delayed for one timing cycle, is referred to as TID_D. Similarly, a TID value which corresponds to a data value which has been delayed for two timing cycles is referred to as a TID_DD value. The state machine of each entry of history buffer unit 214 controls a latch which corresponds to the TID_D value and a latch which corresponds to the TID_DD value by respectively modifying the Hold_D signal and the Hold_DD signal. After each of the TID_D and TID_DD signals are stored within one of the latches, the values remain in the latches as long as the Hold_D and Hold_DD signals remain asserted. Furthermore, the state machine for each entry within history buffer unit 214 asserts a hbx_sel_rby signal (where x corresponds to the index of the history buffer entry in history buffer 214 and y corresponds to a data bus of Result bus 230) when data provided by Result bus 230 (referred to herein as RD values) is latched into a data register and a RV value is latched into a W register of the history buffer entry of history buffer unit 214. It should be noted that at most one of the hbx_sel_rby signals is asserted at a given time per history buffer entry. Furthermore, the hbx_sel_rby signal is provided to a NOR gate. Thus, when the hbx_sel_rby signal is asserted, the asserted signal is inverted to generate a hold signal for the latches which store the data and W fields of a history buffer entry. When the bhx_sel_rby signal is asserted, the hold signal is negated and a new RD value and RV value are latched within the data register and W register of an associated history buffer entry. It should be noted that when the RV value is asserted and is latched into the W register, the data field will be considered to be valid. However, if the W register stores a negated value, data is still being produced by a functional unit.

It should be noted that the HB_Take_Dispatch_Data signal is asserted when a history buffer entry is newly allocated when an instruction which needs a history buffer entry is dispatched. On that occasion, a V bit of a history buffer entry being allocated is still negated and all the monitoring and capturing functions with respect to the Result bus have no effect. Stated another way, monitoring and capturing data is performed by an existing (occupied) history buffer entry, and a new entry being created can only receive data from a dispatch operation.

While operation of history buffer 214 has been generally described, operation of the state machine and a specific example of operation will subsequently be provided. During a description of operation of a state machine for one of the history buffer entries, it should be noted that the W, V and TID fields are provided as an input to the state machines of each entry of the history buffer. Additionally, two comparators provide inputs to the state machine. A first comparator compares a TID field of a history buffer entry to a TID_D value. The other comparator compares the TID field of the history buffer entry to te he TID_DD value. TID_D and TID_DD provide the ability to monitor two pending result data values on a Result bus. Similarly, when the TID field of the history buffer entry corresponds to the TID_DD value, the data provided by Result bus 230 corresponds to a result to be stored within history buffer 214 which has been delayed for at least two timing cycles.

Figures 4, 4A:
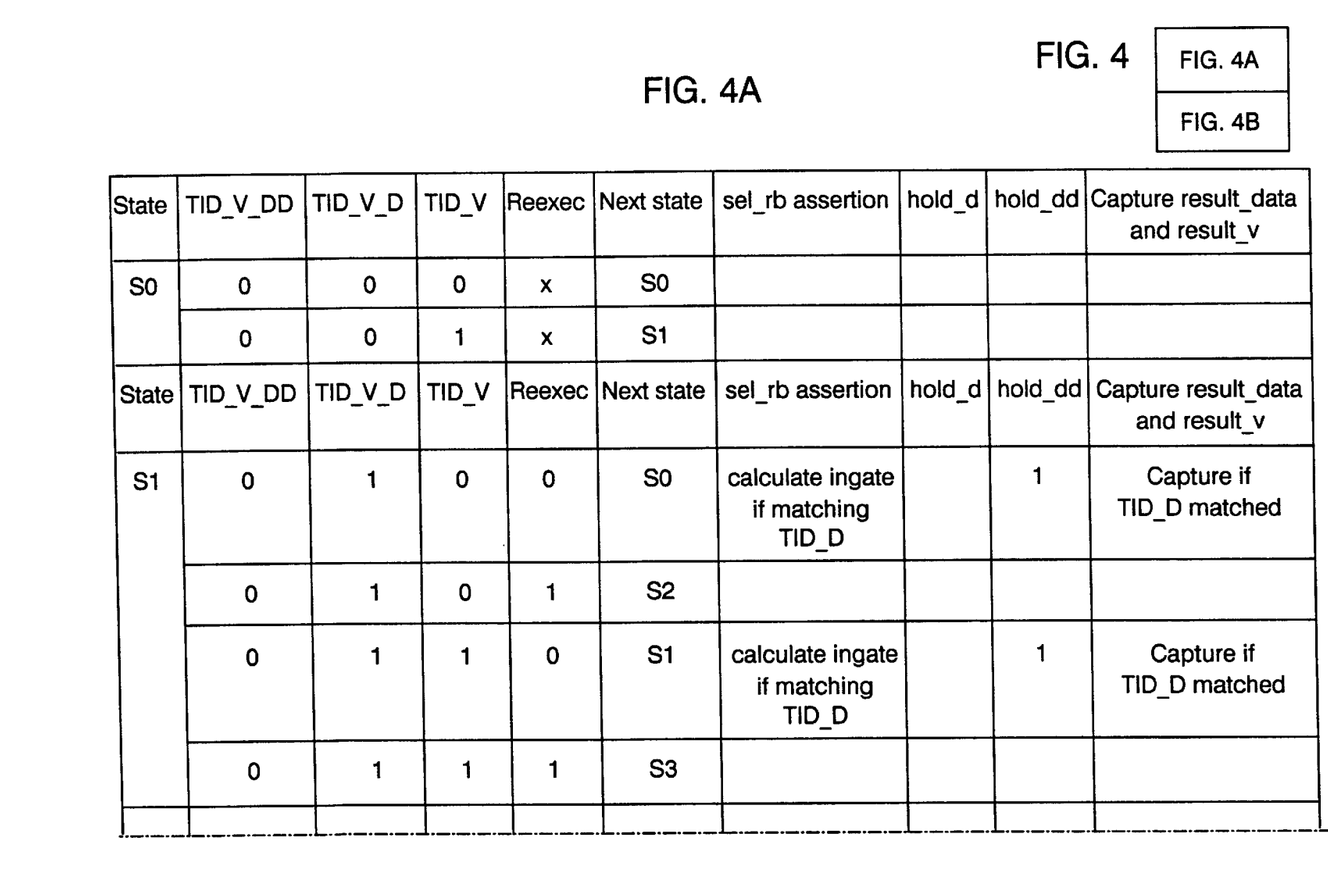
FIG. 4 is a combination of FIGS. 4A and 4B.
FIG. 4A illustrates, in tabular form, a state table in accordance with one embodiment of the present invention.
Figure 4B:
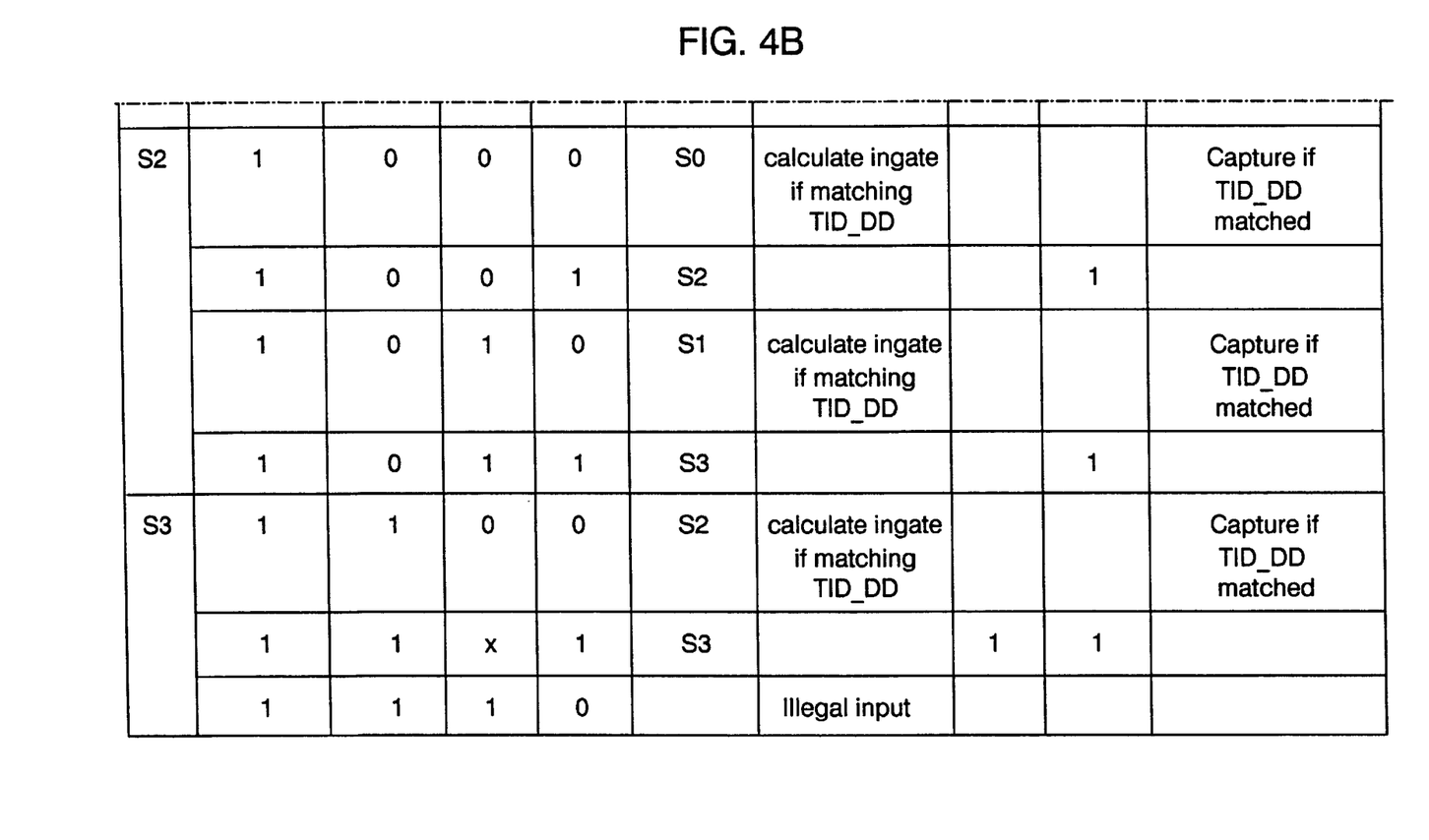
FIG. 4B illustrates, in tabular form, a remaining portion of the state table of FIG. 4A.

A state diagram corresponding to a state machine of each entry within history buffer unit 214 is illustrated in tabular form in FIGS. 4A and 4B. It should be noted that the state machine starts in a state S0. When there is not valid TID broadcast, the state machine remains in state S0. However, when there is a valid TID broadcast from Result bus 230, the state machine transitions from state S0 to state S1. It should be noted that there is a valid TID broadcast when the TID_V signal transferred with the data value on Result bus 230 is asserted. A functional unit asserts the TID and TID_V in consecutive cycles when it anticipates a result.

State S1 is a state wherein a valid TID was captured from a Result bus 230 during a last timing cycle and there is no outstanding re-execution operation pending from the same functional unit which drives the Result bus, or a valid TID was captured when the state machine is in a state S0 (where registers 504 and 508 are holding no valid TIDs). A re-execution operation is indicated by an asserted one of the plurality of Reexec signals. In state S1, if an appropriate Reexec signal is not asserted, data is present on Result bus 230. If the valid bit stored within a V register (such as V register 326) is asserted to indicate that the history buffer entry is a valid entry, and a W bit corresponding to that history buffer entry is negated to indicate that no valid data is stored therein, the state machine corresponding to the history buffer entry will assert sel_rb signal when its TID field stored within a corresponding HB_TID register is equal to a TID_D value stored within a first latch. It should be noted that the TID_D value indicates a TID latched from a previous cycle.

Subsequently, a state of the state machine corresponding to the history buffer entry changes to state S0 if there is no valid TID on Result bus 230 at the current time cycle. Additionally, the state of the state machine corresponding to the history buffer entry changes into state S1 if there is another valid TID on Result bus 230. When the state of the state machine either changes into S0 or loops back to S1 from S1, the Hold_DD signal is asserted to ensure that the TID_V_DD value remains unchanged for a next state setting. Note that the TID_V_DD value and the TID_V_D value are the two digits representing a state. The TID_V_DD value is negated when the state is in either S0 or S1. In case TID_D is not equal to HB_TID, the resultant negated hold_0 signal will let the TID_D and TID_V_D registers be overwritten by new input values.

Furthermore, in state S1, if the Reexec signal corresponding to the history buffer entry is asserted, the data corresponding to the TID latched as the TID_D value is not available on Result bus 230. In this case, the TID_D value must be latched as the TID_DD value. This operation is necessitated by the possibility that another valid TID value may be provided by Result bus 230 during a subsequent operation. If Result bus provides another valid TID value from one of the plurality of functional units 212.0 through 212.n–1, the TID_V value is asserted and a state of the state machine is modified to state S3. Subsequently, if the TID_V value is negated, a state of the state machine is modified to state S2.

When the state machine is operating in state S2, one outstanding re-execution operation is present in a functional unit which is driving a Result Bus 230. However, when the state machine is operating within state S2, there is no other result pending up to and including the previous timing cycle. Therefore, if the Reexec signal from Result bus 230 is asserted and no data is available on Result bus 230, the state machine asserts a Hold_DD signal to hold a TID_DD value until data is provided. If, during a subsequent timing cycle, the TID_V value is asserted to indicate that another TID is provided on Result bus 230, the state machine is changed to state S3 in a next timing cycle. However, if the TID_V value is negated, the state of the state machine remains in state S2. Additionally, if the functional unit negates the Reexec signal, data is available on Result bus 230. The state machine subsequently asserts its output sel_rb signal (e.g. hb0_sel_hb0 for block 321) when a corresponding history buffer entry that needs data has a TID which is equal to the TID_DD value. If a TID_V value is asserted at the same time, the state machine returns to state S1 in a next timing cycle. Otherwise, the state of the state machine is modified to state S0.

State S3 represents a scenario when the functional unit that drives the Result bus has an existing re-execution operation pending, as well as another result with a TID which has already been broadcast to a remaining portion of CPU 110. In this situation, if a Reexec signal corresponding to the one of the plurality of functional units is still asserted in a current time cycle, a state of the state machine remains in S3 and no result data on Result bus 230 is captured. In this case, the Hold_D and Hold_DD are asserted to hold a TID in each of the respective latches which stores the TID_D value and the TID_DD value. If the Reexec signal is not asserted and there is no valid TID broadcast in the current time cycle, a valid history buffer entry that requires data will match its TID value to a TID_DD value. If the two values correspond to one another, the HB_Data register of the history buffer entry will capture the data on Result bus 230. In this case, the state machine is changed to state S2 in a next timing cycle. However, when the Reexec signal is negated and the TID_V value is asserted, an illegal operation has occurred because a functional unit can broadcast only one valid TID when there is an on-going re-execution operation.

By using a state machine to monitor result data provided by each functional unit, a history buffer entry can correctly store result data identified by a corresponding result TID. The state machine also enables the history buffer entry to accommodate a delay of resulting data arrivals. Hence, the invention implements a data processing system and methodology which ensures data is captured in the correct chronological order and avoids corruption of historical values of registers.

The aforementioned description provides one embodiment of the present invention. However, additional embodiments of the present invention may be implemented. For example, in the implementation of the history buffer provided above, the history buffer may monitor the Result bus and can queue two TID values for two pending return data values from a functional unit by incorporating two buffers for storing the TID value (TID_D and TID_DD) and two buffers restoring the TID_V value (TID_V_D and TID_V_DD). As previously described, these buffers are stored within control blocks out of history buffer unit 214. Additionally, it should be noted that the number of buffers may be increased. If the number of buffers is increased in an alternate embodiment to the present invention, the monitoring and capturing operation performed by the history buffer would process more TID values for pending return data values. In this situation, this data machine would be modified to compensate for buffering more result data.

While there have been described herein the principles of the invention, it is to be clearly understood to those skilled in the art that this description is made by way of example only and not as a limit to the scope of the invention. Accordingly, it is intended, by the appended claims, to cover all modifications of the invention which fall within the true spirit and scope of the invention.

What is claimed is:

1. A data processing system, comprising:
   a logic unit for issuing a first instruction having a first target identifier;
   a first functional unit coupled to the logic unit for receiving the first instruction and the first target identifier, the first functional unit providing a first result identifier, a first result, and selectively negating a first control signal; and
   a history buffer coupled to the logic unit for receiving the first target identifier and coupled to the first functional unit for monitoring the first result identifier and for receiving the first control signal, the history buffer storing the first result when the first result identifier is provided and when the first control signal is in a first logic state, wherein the first target identifier identifies a register to be accessed by the first instruction, wherein the first functional unit places the first control signal in a second logic state to indicate that the first result is unavailable for storage within the register.

2. The data processing system of claim 1, further comprising:
   a second functional unit coupled to the logic unit for receiving a second instruction and a second target identifier, the second functional unit providing a second result identifier, a second result, and selectively negating a second control signal.

3. A data processing system, comprising:
   a logic unit for issuing a first instruction having a first target identifier;
   a first functional unit coupled to the logic unit for receiving the first instruction and the first target identifier, the first functional unit providing a first result identifier, a first result, and selectively negating a first control signal; and
   a storage circuit coupled to the logic unit for receiving the first target identifier and coupled to the first functional unit for monitoring the first result identifier and for receiving the first control signal, the storage circuit storing the first result when the first result identifier is provided and when the first control signal is in a first logic state, wherein the first control signal remains in a second logic state until the first result is accessed.

4. A data processing system, comprising:

a logic unit for issuing a first instruction having a first target identifier;

a first functional unit coupled to the logic unit for receiving the first instruction and the first target identifier, the first functional unit providing a first result identifier, a first result, and selectively negating a first control signal;

a history buffer coupled to the logic unit for receiving the first target identifier and coupled to the first functional unit for monitoring the first result identifier and for receiving the first control signal, the history buffer storing the first result when the first result identifier is provided and when the first control signal is in a first logic state;

a second functional unit coupled to the logic unit for receiving a second instruction and a second target identifier, the second functional unit providing a second result identifier, a second result, and selectively negating a second control signal, wherein the second functional unit provides the second result while the second control signal is in a second logic state.

5. The data processing system of claim 4 wherein the history buffer selectively stores both the first result and the second result.

6. A data processing system, comprising:

a logic unit for issuing a first instruction having a first target identifier;

a first functional unit coupled to the logic unit for receiving the first instruction and the first target identifier, the first functional unit providing a first result identifier, a first result, and selectively negating a first control signal; and a storage circuit coupled to the logic unit for receiving the first target identifier and coupled to the first functional unit for monitoring the first result identifier and for receiving the first control signal, the storage circuit storing the first result when the first result identifier is provided and when the first control signal is in a first logic state, wherein the storage circuit further comprises:

a latch for storing the first result; and a state machine for receiving the first control signal and the first result identifier and for selectively generating a select signal to indicate when the first result should be stored in the latch.

7. The data processing system of claim 6, wherein the storage circuit further comprises:

a comparator for comparing the first target identifier and the first result identifier corresponding to a data value provided by the first functional unit, wherein the comparator determines when the first target identifier corresponds to the first result identifer.

8. The data processing system of claim 7, wherein the state machine selectively generates the select signal to indicate that the first result should be stored in the latch when the first target identifier corresponds to the first result identifier and when the first control signal is in the first logic state.

9. A data processing system, comprising:

a logic unit for issuing a first instruction having a first target identifier;

a first functional unit coupled to the logic unit for receiving the first instruction and the first target identifier, the first functional unit providing a first result identifier, a first result, and selectively negating a first control signal; and a history buffer coupled to the logic unit for receiving the first target identifier and coupled to the first functional unit for monitoring the first result identifier and for receiving the first control signal, the history buffer storing the first result when the first result identifier is provided and when the first control signal is in a first logic state, wherein the first control signal indicates the first result is unavailable on a predicted timing cycle when the first control signal is in a second logic state.

10. A method for capturing data in a data processing system, comprising the steps of issuing a first instruction having a first target identifier from a logic unit;

receiving the first instruction and the first target identifier at a first functional unit;

enabling the first functional unit to provide a first result identifier, a first result, and to selectively negate a first control signal;

receiving the first result identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state, wherein the first result identifier identifies a register to be modified by the first instruction; and placing the first control signal in a second logic state to indicate that the first result is unavailable for storage within the register.

11. The method of claim 10, further comprising the steps of:

coupling a second functional unit to the logic unit for receiving a second instruction and a second target identifier; and enabling the second functional unit to provide a second result identifier, a second result, and to selectively negate a second control signal.

12. A method for capturing data in a data processing system, comprising the steps of:

issuing a first instruction having a first target identifier from a logic unit;

receiving the first instruction and the first target identifier at a first functional unit;

enabling the first functional unit to provide a first result identifier, a first result, and to selectively negate a first control signal;

receiving the first result identifier at a history buffer;

enabling the history buffer to monitor an output of the first functional unit for the first result identifier;

receiving the first control signal at the history buffer; and enabling the history buffer to store the first result when the first result identifier is provided and when the first control signal is in a first logic state, wherein the first control signal remains in a second logic state until the first result is available.

13. A method for capturing data in a data processing system, comprising the steps of:

issuing a first instruction having a first target identifier from a logic unit;

receiving the first instruction and the first target identifier at a first functional unit;

enabling the first functional unit to provide a first result identifier, a first result, and to selectively negate a first control signal;

receiving the first result identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state;

coupling a second functional unit to the logic unit for receiving a second instruction and a second target identifier;

enabling the second functional unit to provide a second result identifier, a second result, and to selectively negate a second control signal; and enabling the second functional unit to provide the second result while the second control signal is in a second logic state.

14. A method for capturing data in a data processing system, comprising the steps of:

issuing a first instruction having a first target identifier from a logic unit;

receiving the first instruction and the first target identifier at a first functional unit;

enabling the first functional unit to provide a first result identifier, a first result, and to selectively negate a first control signal;

receiving the first result identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state;

storing the first result in a latch; and enabling a state machine to receive the first control signal and the first result identifier and to selectively generate select signal to indicate when the first result should be stored in the latch.

15. The method of claim 14, further comprising the step of:

comparing the first target identifier and the first result identifier corresponding to a data value provided by the first functional unit to determine when the first target identifier corresponds to the first result identifer.

16. The method of claim 15, further comprising the step of:

selectively generating the select signal to indicate that the first result should be stored in the latch when the first target identifier corresponds to the first result identifier and when the first control signal is in the first logic state.

17. A program storage device readable by a machine, tangibly embodying a program of instructions executable by the machine to perform method steps for capturing data in a data processing system, said method steps comprising:

issuing a first instruction having a first target identifier from a logic unit;

receiving the first instruction and the first target identifier at a first functional unit;

enabling the first functional unit to provide a first result identifier, a first result, and to selectively negate a first control signal in response to the first instruction and the first target identifier;

storing the first target identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state, wherein the first result identifier identifies a register to be modified by the first instruction; and placing the first control signal in a second logic state to indicate that the first result is unavailable for storage within the register.

18. The method steps of claim 17, further comprising the steps of:

coupling a second functional unit to the logic unit for receiving a second instruction and a second target identifier; and enabling the second functional unit to provide a second result identifier, a second result, and to selectively negate a second control signal.

19. A program storage device readable by a machine, tangibly embodying a program of instructions executable by the machine to perform method steps for capturing data in a data processing system, said method steps comprising:

issuing a first instruction having a first target identifier from a logic unit;

receiving the first instruction and the first target identifier at a first functional unit;

enabling the first functional unit to provide a first result identifier, a first result, and to selectively negate first control signal in response to the first instruction and the first target identifier;

storing the first target identifier at a history buffer;

enabling the history buffer to monitor an output of the first functional unit for the first result identifier;

receiving the first control signal at the history buffer; and enabling the history buffer to store the first result when the first result identifier is provided and when the first control signal is in a first logic state, wherein the first control signal remains in a second logic state until the first result is available.

20. A program storage device readable by a machine, tangibly embodying a program of instructions executable by the machine to perform method steps for capturing data in a data processing system, said method steps comprising:

issuing a first instruction having a first target identifier from a logic unit;

receiving the first instruction and the first target identifier at a first functional unit;

enabling the first functional unit to provide a first result identifier, a first result, and to selectively negate first control signal in response to the first instruction and the first target identifier;

storing the first target identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state;

coupling a second functional unit to the logic unit for receiving a second instruction and a second target identifier;

enabling the second functional unit to provide a second result identifier, a second result, and to selectively negate a second control signal; and enabling the second functional unit to provide the second result while the second control signal is in a second logic state.

21. A program storage device readable by a machine, tangibly embodying a program of instructions executable by the machine to perform method steps for capturing data in a data processing system, said method steps comprising:

issuing a first instruction having a first target identifier from a logic unit;

receiving the first instruction and the first target identifier at a first functional unit;

enabling the first functional unit to provide a first result identifier, a first result, and to selectively negate first control signal in response to the first instruction and the first target identifier;

storing the first target identifier at a history buffer;

enabling the history buffer to monitor an output of the first functional unit for the first result identifier;

receiving the first control signal at the history buffer;

enabling the history buffer to store the first result when the first result identifier is provided and when the first control signal is in a first logic state;

storing the first result in a latch; and enabling a state machine to receive the first control signal and the first result identifier and to selectively generate a select signal to indicate when the first result should be stored in the latch.

22. The method steps of claim 21, further comprising the step of:

comparing the first target identifier and the first result identifier corresponding to a data value provided by the first functional unit to determine when the first target identifier corresponds to the first result identifer.

23. The method steps of claim 22, further comprising the step of:

selectively generating the select signal to indicate that the first result should be stored in the latch when the first target identifier corresponds to the first result identifier and when the first control signal is in the first logic state.

* * * * *